(12) United States Patent
Zeng et al.

(10) Patent No.: US 10,657,161 B2
(45) Date of Patent: May 19, 2020

(54) INTELLIGENT NAVIGATION OF A CATEGORY SYSTEM

(71) Applicant: Alibaba Group Holding Limited, George Town (KY)

(72) Inventors: Anxiang Zeng, Hangzhou (CN); Chunxiang Pan, Hangzhou (CN)

(73) Assignee: Alibaba Group Holding Limited (KY)

( * ) Notice: Subject to any disclaimer, the term of this patent is extended or adjusted under 35 U.S.C. 154(b) by 574 days.

(21) Appl. No.: 15/498,773

(22) Filed: Apr. 27, 2017

(65) Prior Publication Data

US 2017/0286435 A1   Oct. 5, 2017

Related U.S. Application Data

(63) Continuation of application No. 13/739,840, filed on Jan. 11, 2013, now Pat. No. 9,690,846.

(30) Foreign Application Priority Data

Jan. 19, 2012   (CN) .......................... 2012 1 0018295

(51) Int. Cl.
*G06F 16/00* (2019.01)
*G06F 16/332* (2019.01)
*G06Q 30/06* (2012.01)

(52) U.S. Cl.
CPC ..... *G06F 16/3322* (2019.01); *G06Q 30/0603* (2013.01)

(58) Field of Classification Search
CPC .................................................. G06F 16/3322
See application file for complete search history.

(56) References Cited

U.S. PATENT DOCUMENTS 6,055,540 A * 4/2000 Snow ....................... G06F 16/30
6,480,857 B1 * 11/2002 Chandler ............ G06F 16/2246
707/792

(Continued)

FOREIGN PATENT DOCUMENTS

CN   101105795 A   1/2008
CN   101334792 A   12/2008

(Continued)

OTHER PUBLICATIONS

The Chinese Office Action dated Dec. 3, 2013 for Chinese patent application No. 201010199106.0, a counterpart foreign application of U.S. Appl. No. 13/256,833, 7 pages.

(Continued)

*Primary Examiner* — Apu M Mofiz
*Assistant Examiner* — Farhad Agharahimi
(74) *Attorney, Agent, or Firm* — Van Pelt, Yi & James LLP

(57) ABSTRACT

Enabling intelligent navigation is described, including: performing analysis of historical user activity data with respect to a query term to generate reference data associated with the query term; selecting a navigation recommendation model for the query term based at least in part on the reference data; using the reference data and the selected navigation recommendation model to determine a set of recommendation data associated with the query term, wherein the set of recommendation data includes at least a portion of a category system to be displayed in response to a subsequently received query including the query term.

19 Claims, 10 Drawing Sheets

(56) References Cited

U.S. PATENT DOCUMENTS

| | | |
|---|---|---|
| 6,489,968 B1 | 12/2002 | Ortega |
| 6,493,702 B1 | 12/2002 | Adar |
| 6,606,619 B2 | 8/2003 | Ortega |
| 7,028,261 B2 | 4/2006 | Smyth |
| 7,080,071 B2 | 7/2006 | Henrion |
| 7,236,969 B1 | 6/2007 | Skillen |
| 7,353,460 B2 | 4/2008 | Tu |
| 7,526,458 B2 | 4/2009 | Flinn |
| 7,606,772 B2 | 10/2009 | Flinn |
| 7,620,628 B2 | 11/2009 | Kapur |
| 7,631,264 B2 | 12/2009 | Jarrad |
| 7,647,309 B1 | 1/2010 | Bar |
| 7,668,885 B2 | 2/2010 | Wittke |
| 7,685,192 B1 | 3/2010 | Scofield |
| 7,716,199 B2 | 5/2010 | Guha |
| 7,797,271 B1 | 9/2010 | Bonneau |
| 7,917,379 B1 | 3/2011 | Burkhardt |
| 7,937,725 B1 | 5/2011 | Schaffer |
| 8,108,255 B1 | 1/2012 | Robinson |
| 8,290,828 B2 | 10/2012 | Stoppelman |
| 8,429,035 B1 | 4/2013 | Kamath |
| 8,630,960 B2* | 1/2014 | Gross .................... G06Q 30/02 705/500 |
| 8,898,283 B2 | 11/2014 | Zhang |
| 9,047,341 B2 | 6/2015 | Pan |
| 2002/0019763 A1* | 2/2002 | Linden ................ G06Q 30/0601 705/14.53 |
| 2002/0138525 A1 | 9/2002 | Karadimitriou |
| 2003/0050916 A1* | 3/2003 | Ortega ................. G06F 3/0482 |
| 2003/0126235 A1 | 7/2003 | Chandrasekar |
| 2003/0212760 A1 | 11/2003 | Chen |
| 2004/0019536 A1* | 1/2004 | Ashkenazi ............ H02M 7/003 705/26.64 |
| 2005/0015274 A1* | 1/2005 | Fennell .................. G06Q 30/02 705/1.1 |
| 2005/0222987 A1 | 10/2005 | Vadon |
| 2005/0267902 A1 | 12/2005 | Thurnhofer |
| 2005/0278351 A1 | 12/2005 | Niyogi |
| 2006/0041549 A1 | 2/2006 | Gundersen |
| 2006/0074907 A1 | 4/2006 | Singhal |
| 2006/0112085 A1* | 5/2006 | Zijlstra ................. G06F 16/382 |
| 2007/0078849 A1 | 4/2007 | Slothouber |
| 2007/0094267 A1 | 4/2007 | Good |
| 2007/0118793 A1 | 5/2007 | Arora |
| 2007/0192318 A1* | 8/2007 | Ramer ................. G06F 16/9535 |
| 2007/0255755 A1 | 11/2007 | Zhang |
| 2008/0162302 A1 | 7/2008 | Sundaresan |
| 2009/0006179 A1 | 1/2009 | Billingsley |
| 2009/0044150 A1 | 2/2009 | Liu |
| 2009/0150343 A1 | 6/2009 | English |
| 2009/0164897 A1 | 6/2009 | Amer-Yahia |
| 2009/0222454 A1 | 9/2009 | Liesche |
| 2009/0222737 A1 | 9/2009 | Liesche |
| 2009/0271826 A1 | 10/2009 | Lee |
| 2009/0282013 A1 | 11/2009 | Joshi |
| 2009/0313227 A1 | 12/2009 | Dunning |
| 2010/0014859 A1 | 1/2010 | D'Alessandro |
| 2010/0082640 A1 | 4/2010 | Wexler |
| 2010/0094845 A1 | 4/2010 | Moon |
| 2010/0161400 A1 | 6/2010 | Snodgrass |
| 2010/0281029 A1 | 11/2010 | Parikh |
| 2011/0225548 A1* | 9/2011 | Callens ................. G06F 3/0481 715/835 |
| 2011/0307839 A1 | 12/2011 | Liao |

FOREIGN PATENT DOCUMENTS

| | | |
|---|---|---|
| CN | 101446959 A | 6/2009 |
| CN | 101770520 A | 7/2010 |
| JP | 2002108939 A | 4/2002 |
| JP | 2006040266 A | 2/2006 |
| JP | 2007233443 A | 9/2007 |
| JP | 2008205820 A | 9/2008 |
| JP | 2009043263 A | 2/2009 |
| JP | 2009104607 A | 5/2009 |
| JP | 2010056913 A | 3/2010 |
| JP | 2010224873 A | 10/2010 |

OTHER PUBLICATIONS

The Chinese Office Action dated Jun. 9, 2013 for Chinese patent application No. 201010199106.0, a counterpart foreign application of U.S. Appl. No. 13/256,833, 7 pages.

The Chinese Office Action dated Oct. 25, 2012 for Chinese patent application No. 201010199106.0, a counterpart foreign application of U.S. Appl. No. 13/256,833, 8 pages.

The Extended European Search Report dated Feb. 27, 2014 for European patent application No. 11792797.0, 3 pages.

The PCT Search Report and Written Opinion dated Mar. 18, 2011 for PCT Application No. PCT/US2011/22131, 10 pgs.

English translation of the Chinese Office Action dated Jun. 12, 2014 for Chinese patent application No. 201010199106.0, a counterpart foreign application of U.S. Appl. No. 13/256,833, 8 pages.

Final Office Action for U.S. Appl. No. 13/256,833, dated Apr. 7, 2014, Chunxiang Pan, "Method, Apparatus and System of Intelligent Navigation," 21 pages.

Non-Final Office Action for U.S. Appl. No. 13/256,833, dated Feb. 28, 2013, Chunxiang Pan, "Method, Apparatus and System of Intelligent Navigation," 13 pages.

Office Action for U.S. Appl. No. 13/256,833, dated Dec. 3, 2013, Chunxiang Pan, "Method, Apparatus and System of Intelligent Navigation," 24 pages.

Office action for U.S. Appl. No. 13/256,833, dated Jul. 30, 2013, Pan, "Method, Apparatus and System of Intelligent Navigation," 29 pages.

Office Action for U.S. Appl. No. 13/256,833, dated Sep. 30, 2014, Chunxiang Pan, "Method, Apparatus and System of Intelligent Navigation," 19 pages.

Takada et al. "A Construction Method of a Hypertext Which Minimizes the Access Cost of a User" Journal of Information Processing Society, Information Processing Societ of Japan, Feb. 15, 1997, vol. 38, Second Edition, pp. 290-298.

Translated Japanese Office Action dated Jan. 13, 2015 for Japanese patent application No. 2013-514163, a counterpart foreign application of U.S. Appl. No. 13/256,833, 11 pages.

Translated Japanese Office Action dated Jun. 10, 2014 for Japanese patent application No. 2013-514163, a counterpart foreign application of U.S. Appl. No. 13/256,833, 10 pages.

* cited by examiner

| dress | Search |

SEARCH RESULTS

| 802 | 804 |
|---|---|
| Brands | H&M   M2M   BCBG   Jorya |
| Sleeve length | Long-sleeved   Sleeveless |
| Material | 100% cotton   Chiffon |
| Skirt length | Tea length   Knee Length |
| Design | Solid colors   Assorted colors |

FIG. 8

INTELLIGENT NAVIGATION OF A CATEGORY SYSTEM

CROSS REFERENCE TO OTHER APPLICATIONS

This application is a continuation of co-pending U.S. patent application Ser. No. 13/739,840 entitled INTELLIGENT NAVIGATION OF A CATEGORY SYSTEM filed Jan. 11, 2013, which claims priority to People's Republic of China Patent Application No. 201210018295.6 entitled AN E-COMMERCE WEBSITE NAVIGATION METHOD AND SYSTEM, filed Jan. 19, 2012, both of which are incorporated herein by reference for all purposes.

FIELD OF THE INVENTION

This application involves website navigation technology. In particular, it involves e-commerce website navigation techniques.

BACKGROUND OF THE INVENTION

Currently, there are three common ways that users use to find desired products on e-commerce websites: through browsing product categories at the websites, through clicking advertisements related to the websites, and performing searches at the websites. Product categories refer to product classifications and are divided into the front-end and the back-end portions. The front-end portion is usually used for UI (user interface) display, the back-end is usually used for product management, and the mapping of relationships between items of the front-end and items of the back-end may be described by rules. Currently, the category systems at websites are expressed as tree structures, with each parent product category representing a node in the tree and having one or more product subcategories, but each subcategory having only one parent product category. Typically, a user interacting with the front-end system may traverse through the different categories of the tree structure by starting with the category at the highest level and clicking through to the subcategories at each subsequent level of the tree. Therefore, as the user traverses from the top to the bottom of the tree structure, the range of products included in each subsequent subcategory becomes increasingly smaller because the product information included in each subcategory becomes more refined.

The following is an example of a process by which a user may typically browse through product categories at a website: products are grouped into categories, and the categories at the highest level of the tree structure (besides the root of the tree) are first grouped. The categories of the group are then ranked based on, for example, the user's interest in each category. The categories are displayed based on their respective ranking. When the user wishes to browse for a desired product, the user may click on one of the displayed categories and browse the product information associated with the selected category and also the subcategories of the selected category. The user may click on one of the subcategories to browse the product information associated with the selected subcategory and also the subcategories of the selected subcategory and repeat traversing through the category system until the user locates the desired product information. For example, a piece of product information may describe a product that is for sale at the e-commerce website. A user would likely need to be familiar with the category system in order to use a typical style of category system navigation technique to find a desired product. The other typical ways of a user finding a desired product at a website includes through clicking on advertisements related to the websites, which selectively promotes an individual product or a particular seller of products at the website, and performing searches at the websites, which requires a user to submit a search query, do not require a user to be familiar with a category system and therefore have become popular ways for search for products.

Intelligent navigation through the category system became available to improve the technique of traversing through the category system (e.g., by reducing a user's searching time and the number of user clicks). Initially, e-commerce websites used the category product quantity navigation form of intelligent navigation. Category product quantity navigation means that after the user has entered keywords, the sorting order of the recommended categories is determined by the quantity of the relevant products under the categories, and then the categories are displayed level by level. Under this technique of category product quantity navigation, which utilizes text matching, an overwhelming number of product categories would be returned to the user because each product category could have several products that match the user's keywords. However, a large number of returned product categories may be confusing for a user and the user might not be able to determine which of the displayed categories includes products that are desirable to the user. For example, in a search for a certain mobile phone handset model number, the first recommended category is "digital accessories," because the quantity of products under the "digital accessories" category far exceeds the quantity of products under a "handset" category, but it is actually the products under the "handset" category that is closer to the user's search intentions than the products of the "digital accessories" category. Therefore, displaying a product category based primarily on the number of products under a category that matches the user's entered keywords is not always desirable.

One solution to target the previously described problem is to determine a category correlation score for each category based on historical category click actions. The technique is sometimes called the category click navigation technique. Then, the categories are ranked and displayed dynamically according to their computed correlation scores (and the categories with relatively low correlation scores may be hidden). However, this navigation technique still fails to do away with the framework of displaying categories starting from the top level of the category system, in which the user is required to click multiple times in order to select more refined categories for screening and selection. Moreover, the processing needed for the described navigation technique requires level-by-level traversal of the category system and also the display portion of the technique is also approached level by level, which may both be time consuming and inefficient to use for a user who wishes to quickly search through the category system.

BRIEF DESCRIPTION OF THE DRAWINGS

Various embodiments of the invention are disclosed in the following detailed description and the accompanying drawings.

FIG. 8 shows an example of search results returned in response to a search with the query term of "dress".

DETAILED DESCRIPTION

Figure 1:
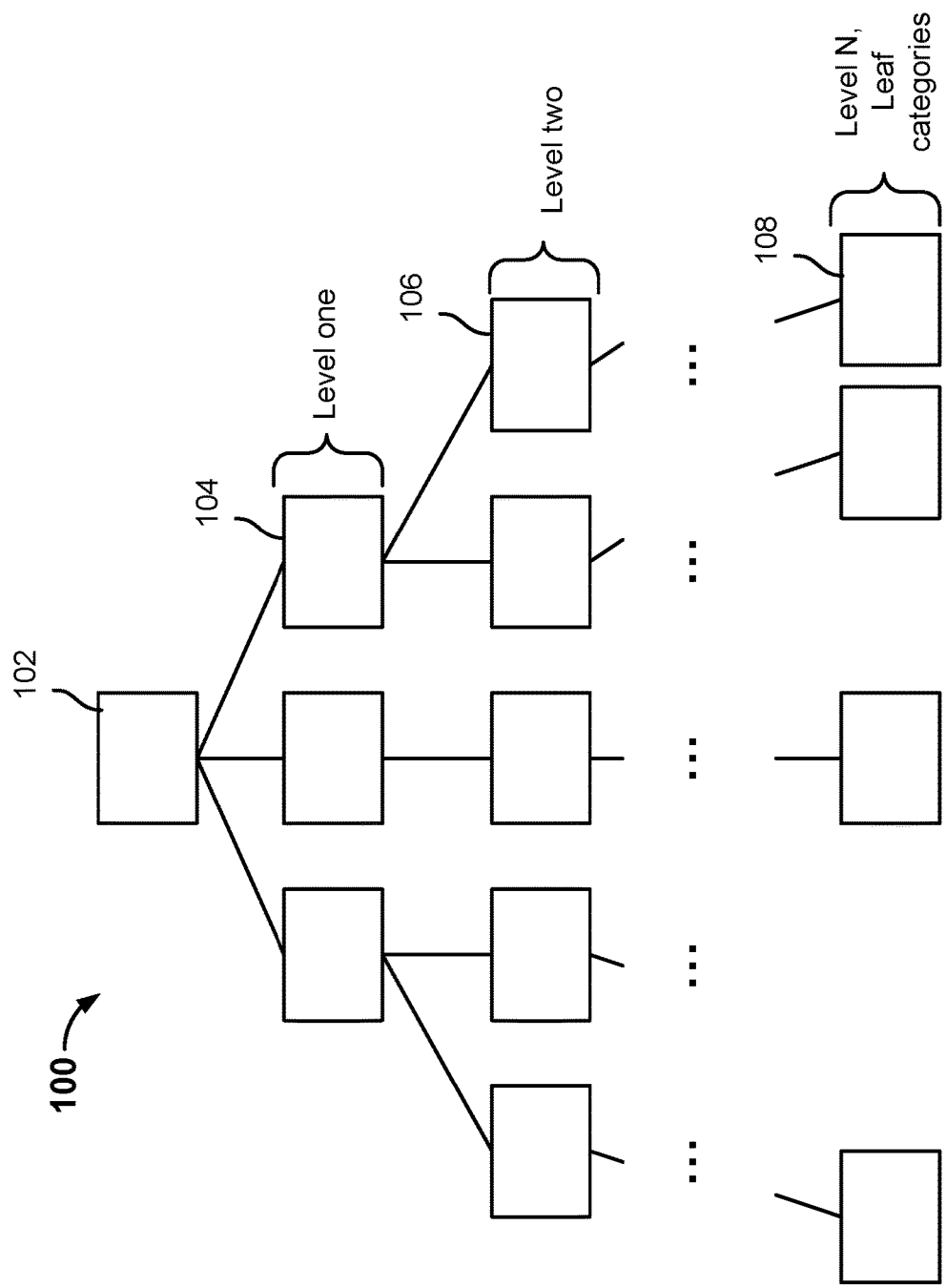
FIG. 1 is a diagram showing an example of a category system organized in a tree structure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In various embodiments, a category system for an e-commerce website includes various product categories of product information associated with products that are sold at the e-commerce website. In some embodiments, the product categories refer to product classifications. Each product category is associated with a set of product information (e.g., product attributes), where each piece of product information is associated with a product that is for sale at the e-commerce website. In some embodiments, each piece of product information includes one or more attributes associated with the product. For example, the material and price of a t-shirt product may both serve as attributes of the t-shirt. Each attribute may have one or more possible values. For example, the material attribute of the t-shirt product may have the value of cotton or the value of wool. In various embodiments, the category system is organized as in a tree structure in the back-end system associated with the e-commerce website, where each product category is represented by a node in the tree.

FIG. 1 is a diagram showing an example of a category system organized in a tree structure. In various embodiments, tree structure 100 represents the organization of the product category information as stored at the back-end system of an e-commerce website. Because the category system includes a hierarchy of product categories, the product categories of the system can be represented as a tree. In the example, each rectangle of tree structure 100 (with the exception of root node 102) represents a product category. The highest product categories in the hierarchy of the category system (not including root node 102) are located at the level referred to as level one. Tree structure 100 includes N levels. Product categories such as product category 104 at level one represent the broadest (and least refined) categories. Each product category of a level may have zero or more subcategories in the next level down the tree. In the example, the next level below level one is referred to as level two. Product category 104, for example, is the parent to subcategory 106. While not shown in the example, the next level below level two is level three, and so forth. A product category that has no subcategory is referred to as a leaf category. In the example, there are several leaf categories, such as product category 108, at the lowest level of tree structure 100, level N.

Typical navigation through the category system represented by tree structure 100 at the front-end system (e.g., for a user who is browsing at the e-commerce website) would reflect the structure of tree structure 100. For example, typically, at the front-end system, a user would first find product categories and information starting at the highest level of the tree, level one. The subcategories of the next level down, level two, may also be displayed so that the user may select from the subcategories to refine the product information. The user may further select subsequent subcategories at subsequent levels to continue to refine the displayed product information until the user either traverses to the leaf categories of the tree structure and/or finds the desired product information. However, navigating through a category system from the highest to the lower level product categories may be inefficient because the user may need to click through several subsequent categories before finding the desired product information at a product category that is several levels deep in the tree structure.

Embodiments of intelligent navigation through a category system are described herein. For each of a plurality of potential query terms, historical web log data that documents historical user activity at an e-commerce website with respect to the query term is analyzed. For example, the web log data includes data that indicates the product categories and/or product information that users have clicked on after searching with the query term and the product categories associated with products that users purchased after searching with the query term. Reference data for the query term is determined from statistical analysis of the historical web log data. A navigation recommendation model is selected for the query term based at least in part on the reference data. The reference data is used with the selected navigation recommendation model to determine a set of recommendation data that includes at least a portion of a category system to be displayed at the front-end of the e-commerce system in response to a user's query submission including the query term. In some embodiments, the selected navigation recommendation model uses the reference data to determine a product category of the category system, if any, that is to move at least one level up in the category system within the version of the category system that is to be displayed to a user as recommended data. At least the portion of the category system that includes the product category situated at the higher level is included in the recommendation data. The effect of moving a product category (or several product categories) into a higher level of the hierarchy of the category system within a version of the category system to be displayed to a user at the front-end is to allow that product category, which has been determined by the navigation recommendation model to be of greater interest to a user, to be more easily navigated to by a user traversing down the tree structure of the category system level-by-level. As such, the combination of the navigation recommendation model and reference data determines how certain product categories of the category system could be rearranged at a higher level and therefore displayed to a user at the front-end earlier (by virtue of being placed at a higher level) than it would have been without the rearrangement. In some embodiments, an association between the recommendation data and the query term is recorded in a recommendation list. Then, for a subsequently received query, at least one query term will be looked up in the recommendation data for the set of matching recommendation data (the portion of the category system that includes at least one moved up product category determined for that query term). The matching recommendation data will be displayed for the user at the front-end to enable navigation through the rearranged category system to more rapidly find desirable product information than would have been possible with the category system without the rearrangement.

Figure 2:
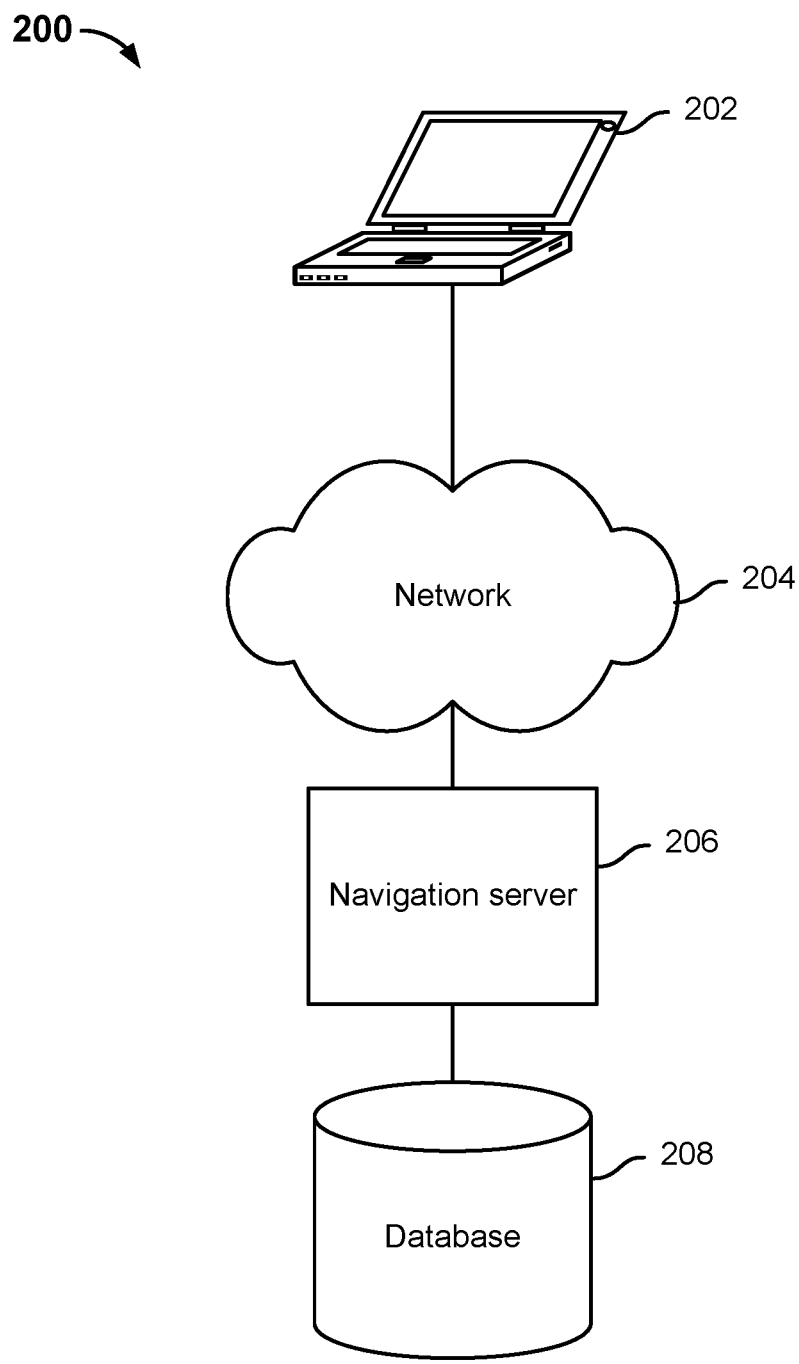
FIG. 2 is a diagram showing an embodiment of a system for enabling an intelligent navigation through a category system.

FIG. 2 is a diagram showing an embodiment of a system for enabling an intelligent navigation through a category system. In the example, system 200 includes device 202, network 204, navigation server 206, and database 208. Network 206 may include high-speed data networks and/or telecommunications networks.

Device 202 is configured to communicate with an e-commerce website associated with navigation server 206 over network 204. While device 202 is shown to be a laptop computer, other examples of device 202 include a desktop computer, a mobile device, a smartphone, a tablet device, and/or any other sort of computing device. A user using a device such as device 202 may browse, purchase products, and performs clicks (e.g., with a mouse device) with one or more product categories at the e-commerce website. Typically, the user navigates through the category system of the e-commerce website from the product categories at the highest level to the product categories at the lowest level of the hierarchy of the category system. Such user activity may be tracked and stored by navigation server 206 at database 208 as web log data. The category system for the product categories of the e-commerce website may be stored at database 208 as well.

Navigation server 206 is configured to use the web log data (including the historical user activity data) stored at database 208 to determine a portion of the category system to be included in the set of recommendation data to be displayed for each of several query terms that users may include in a subsequent search query at the e-commerce website. Because the category system associated with the e-commerce website may include numerous product categories and require a user to click through several categories until the user reaches a category associated with a product that the user desires, determining a relevant portion of the category system to be returned as recommendation data for each query term would be helpful in enabling a user to more quickly find desirable products. Furthermore, the portion of the category system that is determined as the recommendation data for a query term may include a product category that has been moved up to a higher level of the hierarchy of the category system due to a determination that it has met certain criteria associated with moving up in the hierarchy. In some embodiments, an association between the query term and its determined set of recommendation data is stored in a recommendation list stored at database 208.

In response to a user's subsequent submission of a search query at the e-commerce website at a device such as device 202, navigation server 206 is configured to look up a query term included in the search query in the recommendation list. If the query term may be found on the recommendation list, then the product categories and/or product attributes included in the corresponding recommendation data are returned and displayed for the user.

Figure 3:
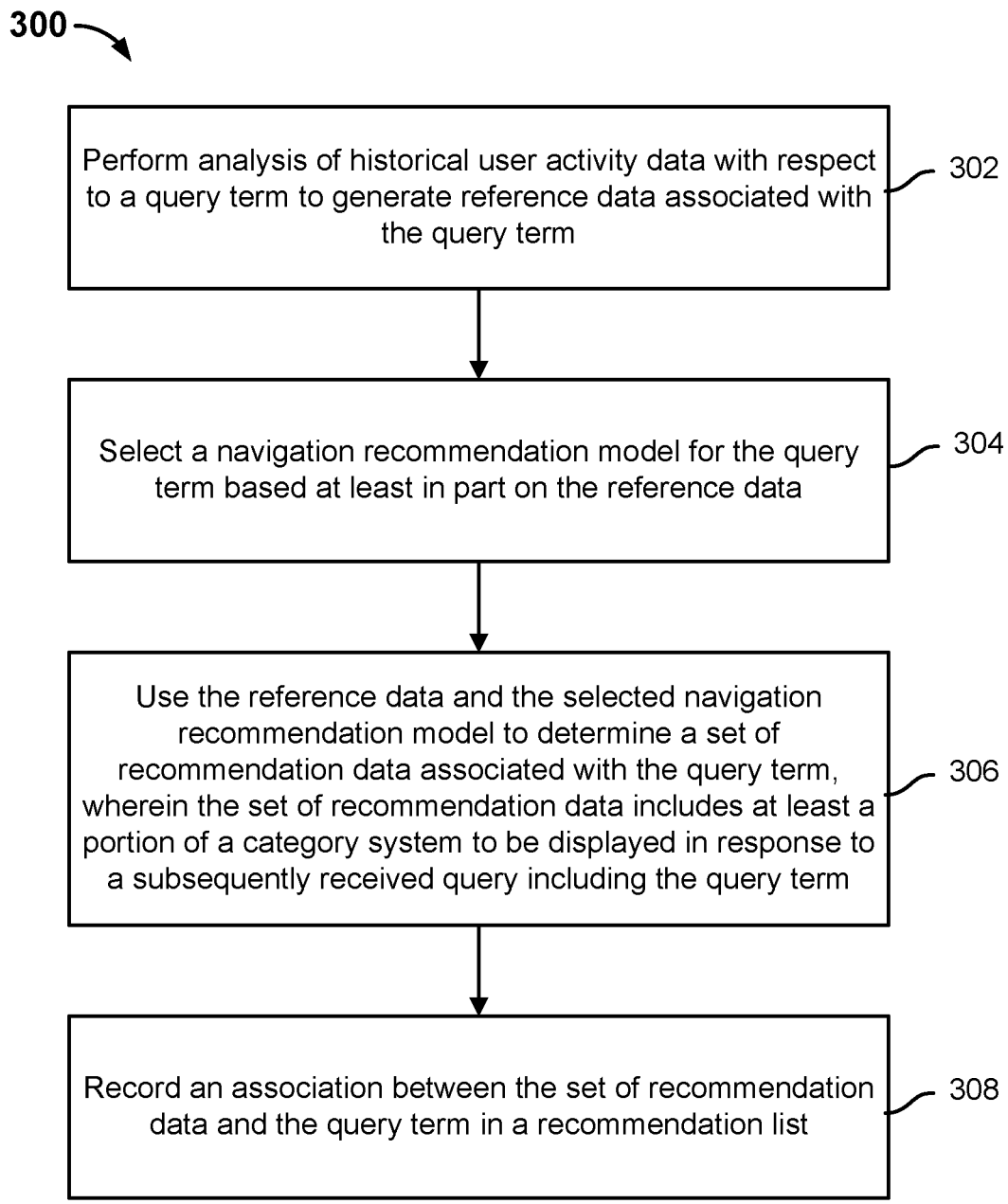
FIG. 3 is a flow diagram showing an embodiment of a process for generating recommendation data for query terms.

FIG. 3 is a flow diagram showing an embodiment of a process for generating recommendation data for query terms. In some embodiments, process 300 may be implemented at system 100.

Process 300 is used to determine and record recommendation data for each of one or more query terms that may be used by users at an e-commerce to search for relevant product categories.

At 302, analysis of historical user activity data with respect to a query term is performed to generate reference data associated with the query term. In some embodiments, the historical user activity data of one or more users at an e-commerce website is stored as web log data. Web log data may refer to the server's logs of user activity. For example, the web log data includes data that indicates the product categories and/or product information that users have clicked on, the product categories associated with products that users purchased, and query terms searched by which users. For example, the historical user activity data may indicate that after searching with the query term of "light", the user clicked on the displayed level one categories of "lamps" and "candles". The query term may be from a list of query terms that a user may potentially use in a subsequent search for products at the e-commerce website. For example, the list of query terms may include query terms used in historical queries at the website.

In some embodiments, reference data comprises data corresponding to one or more categories of the category system that results from statistical analysis of historical user activity data. Some examples of the reference data associated with the query term may include one or more of the following: category click distribution data (sometimes referred to simply as "click data") corresponding to the query term, category purchase distribution data (sometimes referred to simply as "purchase data") corresponding to the query term, and category correlation distribution data (sometimes referred to simply as "product quantity data") corresponding to the query term. Reference data may correspond to several categories of the category system. An example of determining each of category click distribution data, category purchase distribution data, and category correlation distribution data corresponding to the query term is below:

1) The following example technique may be used to obtain the category click distribution data corresponding to the query term:

To determine the category click distribution data corresponding to the query term, historical user activity data is analyzed for the click distribution (e.g., quantity of level one product categories that were clicked on by users (breadth distribution) after searching with the query and also for each clicked on level one product category, how many subsequent levels of subcategories the users clicked through (depth distribution) (e.g., whether the user clicked through to level two, level three, and so forth, until the user reached a leaf category)) and/or click traffic (e.g., the total number of clicks for each product category).

For example, statistical calculation of the click distribution of level one product categories clicked by users after users entered the query term "gloves" in a search box includes determining the breadth and depth distribution of categories clicked on by users based on the historical user activity data. For breadth distribution, for example, the level one product categories clicked after "gloves" was entered include the category of "outdoors/mountain climbing/camping/travel" and the category of "clothing accessories/belts/scarves and hats". For depth distribution, for example, users continued to click beyond level one product categories to level two categories and level three categories, etc., right through to leaf categories. For each category clicked on by users, the click traffic for this category is statistically calculated based on counting the number of clicks for this category in the historical user activity data. Through the statistical analysis described above, category click distribution data including click distribution and the click traffic for each category may be obtained.

In some embodiments, the following may be performed on the historical user activity data to eliminate query terms for which there is insufficient data:

The total number of user clicks across all the product categories in the historical user activity is counted and recorded for each query term. In some embodiments, a count of clicks is referred to as "click traffic." A first click threshold value may be configured such that those query terms associated with total clicks that are less than the first click threshold value are ignored and recommendation data will not generated for these ignored query terms. However, those query terms associated with total clicks that are equal to or greater than the first click threshold value are retained and recommendation data will be generated for these retained query terms.

In some embodiments, the following is optionally performed to prevent user fraud:

The total number of user clicks across all the product categories in the historical user activity is counted and recorded for each query term with respect to each user. A second click threshold value may be configured such that those query terms for a certain user associated with total clicks that exceed the second click threshold value will have their respective click traffic attenuated.

For example, if the click traffic for a certain query term X by a certain user A exceeds a second click threshold value, then it is assumed that user A may have had fraudulent clicking intentions (because user A had an interest in artificially increasing the click traffic for query term X or that this query term is of a special preference to user A and is not representative of the click intention of the majority of users for query term X). Because there is the chance that this click traffic, which is greater than the second click threshold value, may be fraudulent in nature, the click traffic may be attenuated (so as to lessen the influence of this click data sample). One example attenuation technique is as follows: reduce this potentially fraudulent click traffic to a configured maximum click traffic value.

2) The following example technique may be used to obtain the category purchase distribution data corresponding to the query term:

To determine the category purchase distribution data corresponding to the query term, the historical user activity data is analyzed to determine, of the products that were displayed in response to a search using the query term, which products were clicked on and ultimately purchased and by which users. Thus, the category purchase distribution data corresponding to the query term may include identifying information associated with products that were purchased in association with the query term, identifying information associated with the product categories the purchased products are from, and identifying information associated with the users that made those purchases. Because a search of the query term gave rise to the ultimate purchase of certain products, there is a purchase correlation between the query term, the products that were purchased after searching with the query term, and the users who purchased the products.

3) The following example technique may be used to obtain the category correlation distribution data corresponding to the query term:

To determine the category correlation distribution data corresponding to the query term, the historical user activity data is analyzed to determine of the quantity of products included in each clicked product category that was related to the query term.

For example, a quantity of products related to the query term in each clicked category is first determined for level one product categories, then level two categories, . . . , leaf categories. Thus, the category correlation distribution data corresponding to the query term ultimately includes the quantity of products related to the query term under each category that was clicked on by users that had searched with the query term.

In some embodiments, the quantity of products related to the query term under a clicked product category is not necessarily related to the query term in the text-matching sense. For example, if a product category were recommended to a user based on the number of products under that category that match the query term on a text-basis, then categories other than those most interested by the user may be returned. For example, at the e-commerce website, a user may search for a certain model of a mobile phone. If text-matching were used, then because the quantity of products under the mobile phone accessories category that match the query term far exceeds the quantity of products in the mobile phone category that match the query term, the category most recommended to the user is therefore the mobile phone accessories category, which is not the category that the user is most interested in, the mobile phone category. However, if recommendations are made in accordance with the category correlation distribution data described above, because the historical user activity data may include data that indicates that users who submitted a query such as the mobile phone model number more commonly select the mobile phone category than the mobile phone accessories category, then it may be inferred that the mobile phone category is more strongly correlated to the query term of a mobile phone model number than the mobile phone accessories category.

In some embodiments, the reference data may include any one or more of the previously described category click distribution data, category purchase distribution data, and category correlation distribution data. Moreover, when any two or more of these types of data are included in the reference data, they can be proportionately weighted, and the weighted values may be used as the reference data.

In some embodiments, in addition to the processing of 1), 2), and 3) above, any one or more of the following steps may be optionally performed:

4) The following example technique may be used to determine users' navigation click data when searching a query term:

In some embodiments, based on the historical user activity data, in response to a search with the query term, the navigation click data is determined to include the products categories that were clicked and the products under these categories were clicked. In some embodiments, navigation click data may also be included in the reference data.

5) The following example technique may be used to determine whether two product categories are to be merged together:

In some embodiments, if it is determined that two product categories (e.g., at the same level of the category system) are associated with similar meanings exist in the category system, the two product categories may need to be merged together into one product category with the combined product information associated with the two merged product categories.

For example, because the product category of "computer furniture" is similar to the product category of "computer accessories", the two product categories of "computer furniture" and "computer accessories" may be merged together.

6) The following example technique may be used to filter out product categories associated with low click traffic:

For example, the click traffic for each product category may be aggregated based on the historical user activity data. A threshold may be set such that product categories associated with click traffic that are lower than the threshold are filtered out and ignored in subsequent processing.

7) The following example technique may be used to filter out of invalid product category data:

In some embodiments, after an adjustment of a website category system, some product categories may have been deleted or merged into other categories. Such categories are invalid categories that may be filtered out and ignored in subsequent processing.

At 304, a navigation recommendation model is selected for the query term based at least in part on the reference data.

A plurality of navigation recommendation models may be available to be used to determine a portion of a category system as recommendation data for the query term. In some embodiments, the particular navigation recommendation model to be selected for a particular query term may be determined based on the distribution characteristics of the reference data determined for that query term. Various examples of navigation recommendation models are described further below.

The following are example steps that may be performed to select the appropriate navigation recommendation model using the reference data:

1. First, each of the types of data (the category click distribution data, the category purchase distribution data, and/or the category correlation distribution data) included in the reference data for each product category is weighted proportionally and normalized. For example, each type of data may be assigned a definite proportional weight.

In some embodiments, the weight of the category click distribution data may be increased for high-frequency query terms, and the weight of the category correlation distribution data may be increased for low-frequency query terms. For example, if the total number of clicks for a certain query term is <100 (e.g., the query term is a low-frequency query term), the weight of the category correlation distribution data is increased, where the category correlation distribution data weight=100/(total number of clicks) (and if the category correlation distribution data weight is not increased, it would have been equal to or less than 1).

2. The data obtained in the previous step, step 1, are aggregated for each level one product categories based on the hierarchy of the category system.

After the processing in step 1, one piece of weighted and normalized data is obtained corresponding to each level one product category based on the aggregated reference data associated with the product category. Based on the hierarchy of product category levels in the tree structured category system, weighted and normalized data in lower level categories is aggregated with the product category one level above, level by level up the category system, until the data from a branch of the category system is ultimately aggregated to the highest level (besides the root node), a level one product category. Thus, weighted and normalized data aggregated through every level of subcategory under each level one product category is obtained for each level one product category.

3. The navigation recommendation model to be used is selected based at least in part on the aggregated data for the level one product categories.

For example, a set of rules that maps the distribution characteristics of aggregated data determined for level one product categories to specific navigation recommendation models may be configured. Below are some examples of such rules:

If the level one product category click traffic is concentrated in the "books" product category, then the "books" category recommendation model, which will be described further below, is selected.

If the two level one product categories associated with the greatest click traffic are the specific level one categories of "men's apparel" and "women's apparel" level one product categories, then the parent/sub-category recommendation model, which will be described further below, is selected.

If the two level one product categories associated with the greatest click traffic are the specific level one categories of "men's shoes" and "women's shoes" level one product categories, then the "shoes" category recommendation model, which will be described further below, is selected.

If the ratio of the click traffic of the level one product category associated with the greatest click traffic to the total click traffic across all level one product categories is <0.2, then the divergent recommendation model, which will be described further below, is selected.

If the ratio of the click traffic of the level one product category associated with the greatest click traffic to the total click traffic across all level one product categories is >0.98, then the direct category recommendation model is selected.

If the query term implies category information, then the recommendation model with incorporated category searching, which will be described further below, is selected.

If the query term implies product descriptive information, then the category/attribute mixed composition recommendation model, which will be described further below, is selected.

If none of the conditions described above is satisfied, then the tiled category recommendation model, which will be described further below, is selected.

The navigation recommendation models described above are only examples, and in actual application, other types of navigation recommendation models may be used as well.

At 306, the reference data and the selected navigation recommendation model are used to determine a set of recommendation data associated with the query term, wherein the set of recommendation data includes at least a portion of a category system to be displayed in response to a subsequently received query including the query term.

In various embodiments, the selected navigation recommendation model uses the reference data to rearrange at least some product categories of the category system by selecting at least one non-level one product category to move up a level in the hierarchy/tree structure and to replace its parent category in that higher level. The product category(ies) that are selected to be moved are considered to be of greater interest to a user who has searched using the query term associated with the reference data and so by moving the product category(ies) to one or more levels higher than its original location in the hierarchy/tree structure in the returned portion of the category system, those product category(ies) could be navigated to more rapidly by a user who is navigating down the tree structure of the category system. The recommendation data determined by the navigation recommendation model includes a portion of the category system that includes the product category(ies) (and the product attributes associated with such product category(ies)) that were moved up one or more levels from the level of the category system in which they were originally located. As such, the recommendation data may include the product categories that were determined to be moved up in the category system and/or the product attributes thereof. For example, the recommendation data may include a display of at least the product category(ies) that were moved up and/or the product attributes under such product categories.

In some embodiments, the rearrangement of product categories (e.g., the moving up of product categories to high levels to replace parent product categories) in the recommendation data as determined by navigation recommendation models and the reference data may not necessarily alter the tree structure of the category system that is stored at the back-end of the e-commerce website. Rather, the structure of the category system may remain static at the back-end, while altered copies of at least portions of the category system may be determined for sets of recommendation data to be associated with various query terms.

Figure 4:
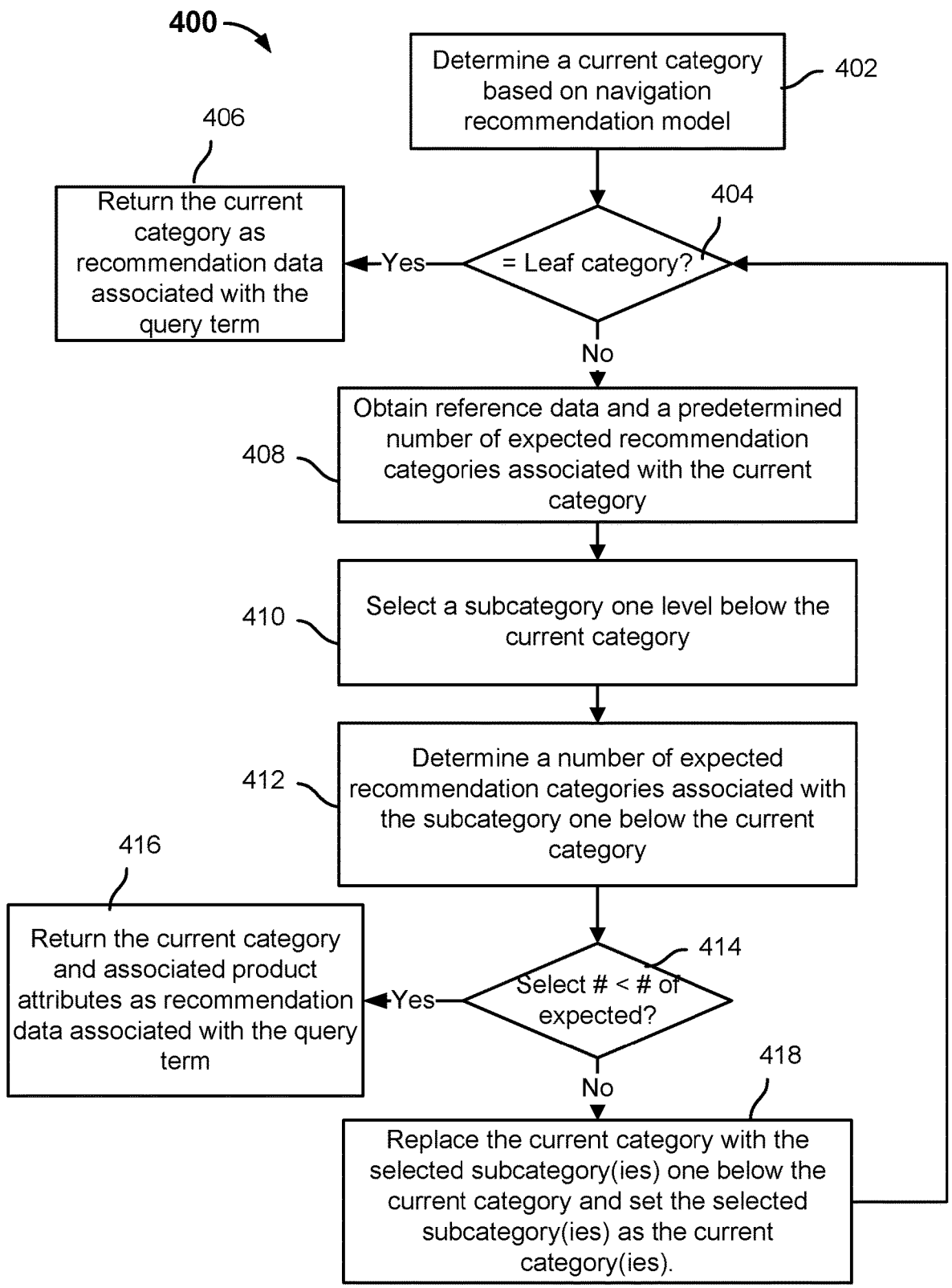
FIG. 4 is a flow diagram showing an embodiment of a bottom-up recursive technique.

In some embodiments, the selected navigation recommendation model uses the reference data to rearrange at least some product categories of the category system using a "bottom-up" recursive technique that starts from a current location/product category in the category system (e.g., that is determined by the navigation recommendation system) and determines whether that product category (and any other product categories that share the same parent product category) meets a certain criteria and therefore should be moved up to the level above, which is the same level as its parent product category and/or to replace its parent product category. For example, a certain criteria for moving a product category to a higher level may be that the product category has more click traffic or more purchased items than its parent product category. FIG. 4 below describes one example of such a bottom-up recursive technique.

Thus, a user may be able to locate desired product information within a set of recommendation data (returned in response to the associated query term) faster because certain product categories have been moved up to higher levels within the category system and are easier to navigate to than if they had remained in their original lower levels in the category system. For example, referring back to FIG. 1, assume that tree structure 100 represented a category system and after applying the selected navigation recommendation model with the reference data associated with a query term to the category system, in response to a subsequent user search for that query term, a portion of tree structure 100 may be returned to the user as the recommendation data, where the portion may include a product category having been moved up one or more levels. For example, in the recommendation data, product category 106 may be now be located in level one, where it had previously been located in level two. Thus, even if the user is navigating through the displayed product categories of the recommendation data level-by-level from the top of tree structure 100 (i.e., the product categories located at level one), the user will encounter product category 106, which had been moved to level one, sooner than the user would have had product category 106 remained in its original level, level two.

Returning to FIG. 3, at 308, an association between the set of recommendation data and the query term is recorded in a recommendation list. The association between the set of recommendation data determined for the query term is recorded in a recommendation list. Then, for a subsequently received query that includes the query term, the query term is looked up in the recommendation list to determine the set of associated recommendation data to send to the user that submitted the query.

FIG. 4 is a flow diagram showing an embodiment of a bottom-up recursive technique. In some embodiments, process 400 is implemented at system 100. In some embodiments, process 400 may also be referred to as the automatically launched recommendation technique.

In some embodiments, process 400 may be used by a navigation recommendation model selected for a particular query term in a process such as 306 of FIG. 3. Process 400 is used to determine whether a current category of the category system should be moved up at least one level within the hierarchy of the category system. For example, the navigation recommendation model may determine the current category(ies) to use in process 400. The techniques by which each of the various navigation recommendation models determines the current category(ies) are different as will be described further below.

At 402, a current category is determined based at least in part on a selected navigation recommendation model. The selected navigation recommendation model (e.g., such as in 304 of process 300 of FIG. 3) is used to determine one or more current categories of the category system. The one or more current categories will serve as a starting location in the hierarchy of the category system for the automatically launched recommendation technique in determining recommendation data among the product categories of the hierarchical category system.

Figure 5:
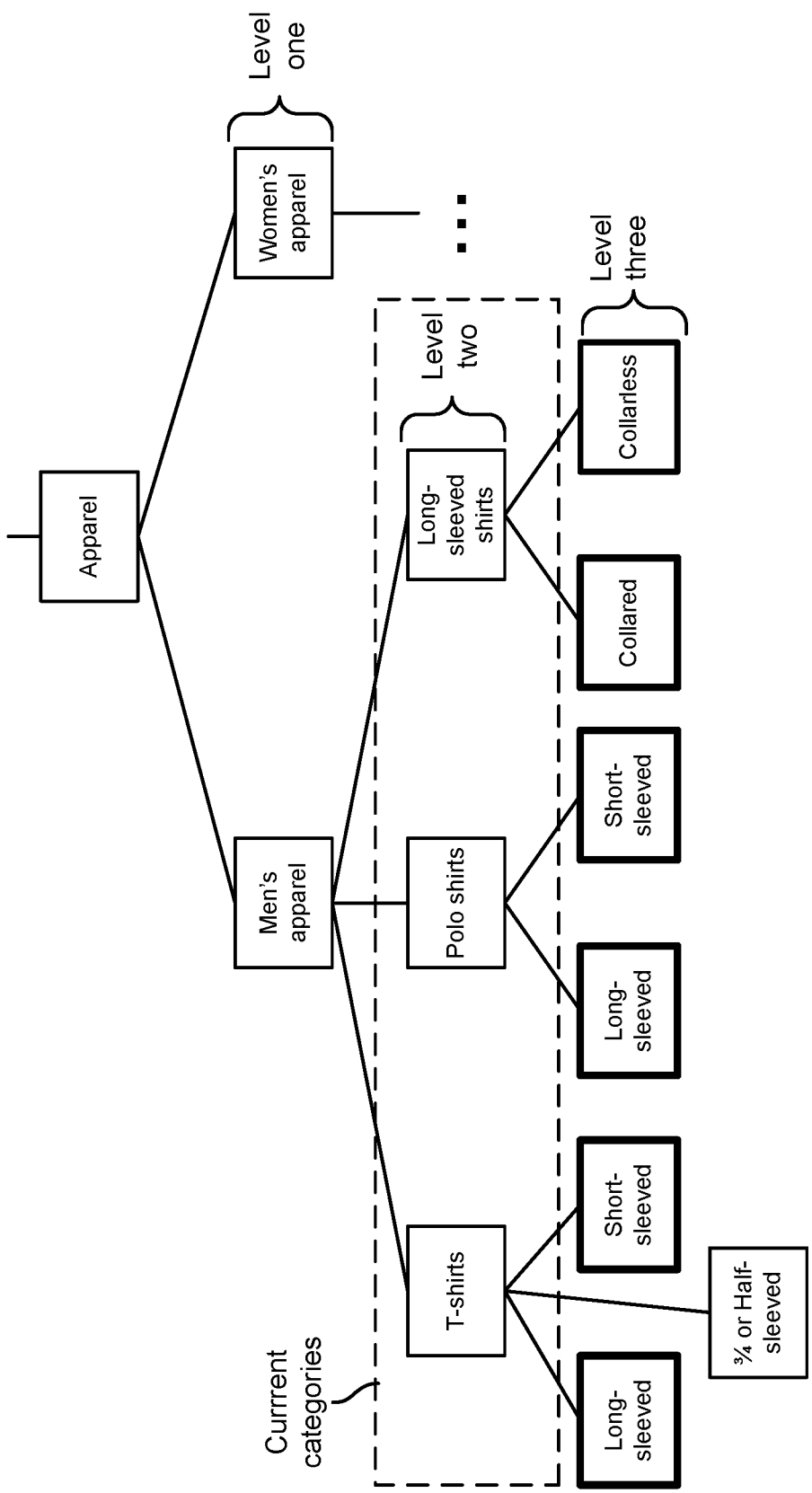
FIG. 5 is an example of a portion of a category system.

An example of at least a portion of a category system is depicted in FIG. 5. In the example, the depicted portion of the category system corresponds to the query term of "apparel". The depicted portion of the category system in the example may reflect the manner in which the product category information and relationships with each other are stored at a back-end system associated with an e-commerce website. However, the structure in which product categories are stored at the back-end may not be the most efficient way to display at least some of such product categories at the front-end (e.g., in response to a user's submitted search query). As such, application of the automatically launched recommendation technique, as will be described below, to the depicted category system will help determine the portion of the category system that may be recommended to a user at the front-end system in response to a user's submitted search query that includes the query term of "apparel". In the example, the product categories of "men's apparel" and "women's apparel" are located at level one of this portion of the category system. The subcategories of "men's apparel" at level two are "T-shirts", "Polo shirts", and "Long-sleeved shirts". The subcategories of "T-shirts" at level three are "Long-sleeved T-shirts", "Three-quarters or half-sleeved T-shirts", and "Short-sleeved T-shirts". The subcategories of "Polo shirts" at level three are "Long-sleeved Polo shirts" and "Short-sleeved Polo shirts". The subcategories of "Long-sleeved shirts" at level three are "Collared long-sleeved shirts" and "Collarless long-sleeved shirts".

Assume that in this example, the current categories determined by the selected navigation recommendation model are the categories one level below the "men's apparel" category comprising "T-shirts", "Polo shirts", and "Long-sleeved shirts".

Returning to FIG. 4, at 404, it is determined whether the current category comprises a leaf category. In the event that the current category is a leaf category (a category that has no subcategories and is at the lowest level of the category system hierarchy), then control passes to 406. Otherwise, in the event that the current category is not a leaf category (i.e., the current category has at least one subcategory), then control passes to 408.

At 406, the current category and associated product attributes are returned as a set of recommendation data associated with the query term and the process ends.

At 408, reference data associated with a query term and a predetermined number of expected recommendation categories associated with the current category are obtained. In some embodiments, the reference data associated with product categories of a category system (e.g., as determined by 302 of process 300 of FIG. 3) is obtained. As described above, the reference data may include one or more of: category click distribution data, category purchase distribution data, and the category correlation distribution data related to each category of the category system. In some embodiments, the reference data is weighted and normalized. In some embodiments, the predetermined number of expected recommendation categories associated with the current category comprises a number of categories that are expected to be included in the recommendation data for the query term.

Referring to FIG. 5, the reference data associated with the query term of "apparel" would be obtained for each of the shown product categories.

Returning to FIG. 4, at 410, a subcategory one level below the current category is selected based at least in part the subcategory being associated with a click ratio that exceeds a predetermined threshold, wherein the click ratio comprises a click traffic associated with the subcategory to a click traffic associated with the current category.

Referring to FIG. 5, the example shows that the subcategories one level below the current category of "T-shirts," comprise "Long-sleeved T-shirts", "three-quarters or half-sleeved T-shirts", and "Short-sleeved T-shirts". The subcategories one level below the current category of "Polo shirts" comprise "Long-sleeved Polo shirts" and "Short-sleeved Polo shirts". The subcategories one level below the current category of "Long-sleeved shirts" comprise "Collared long-sleeved shirts" and "Collarless long-sleeved shirts". Based on the obtained reference data, the click ratios for both the "Long-sleeved T-shirts" subcategory one level below the current category of "T-shirts" and the click ratio for the "Short-sleeved T-shirts" subcategory one level below the current category of "T-shirts" exceed the predetermined threshold, so these two subcategories are selected. However, the click ratio for the subcategory of "Three-quarters or half-sleeved T-shirts" does not exceed the predetermined threshold and so that subcategory is not selected. Likewise, among the subcategories one level below the current category of "Polo shirts," the click ratios of both "Long-sleeved Polo shirts" and "Short-sleeved Polo shirts" exceed the predetermined threshold and so these two subcategories are selected. Finally, among the subcategories one level below the current category of "Long-sleeved shirts," the click ratios of both "Collared long-sleeved shirts" and "Collarless long-sleeved shirts" exceed the predetermined threshold and so these two subcategories are selected. In the example of FIG. 5, the selected subcategories one level below the current categories are represented with a rectangle of a darker outline.

Returning to FIG. 4, at 412, a number of expected recommendation categories associated with the subcategory one level below the current category is determined based at least in part on the predetermined number of expected recommendation categories associated with the current category.

For example, assume that the predetermined number of expected recommendation categories is a configurable value that is represented by X. Based on this, the number of expected recommendation categories associated with the subcategory(ies) one level below the current category can be represented by Y and can be determined using the following formula:

$$Y = X * \text{the click ratio for a current category} + 1$$

If there are multiple current categories, then the number of expected recommendation associated with the subcategory(ies) one level below the current category Y may be determined for each such current category.

Referring to FIG. 5, assume that the value of X is configured as 6. Then assume that the click ratio for the current category of "T-shirts" is 0.5, the click ratio for the current category of "Polo shirts" is 0.4, and the click ratio for the current category of "long-sleeved shirts" is 0.1. Then, the number of expected recommendation subcategories one level below the current category of "T-shirts" Y is 4, the number of expected recommendation subcategories one level below the current category of "Polo shirt" Y is 3, and the number of expected recommendation subcategories one level below the current category of "Long-sleeved shirts" Y is 1.

Returning to FIG. 4, at 414, it is determined whether a number of selected subcategory(ies) one level below the current category is greater than the number of expected recommendation categories associated with the subcategory one level below the current category. In the event that the number of selected subcategory(ies) one level below the current category is greater than the number of expected recommendation categories associated with the subcategory one level below the current category, the control passes to 416.

At 416, the current category and associated product attributes are returned as recommendation data associated with the query term and the process ends. Referring to the previous example associated with FIG. 5, the number of selected subcategories one level below the current category of "Long-sleeved shirts", 2, is greater than the number of expected recommendation categories associated with the subcategory one level below the current category of "Long-sleeved shirts", 1. Thus, the current category of "Long-sleeved shirts" associated product attributes are returned as a set of recommendation data associated with the query term "apparel" and the process ends.

Otherwise, in the event that the number of selected subcategory(ies) one level below the current category is less than or equal to the number of expected recommendation categories associated with the subcategory one level below the current category, the control passes to 418.

Figure 6:
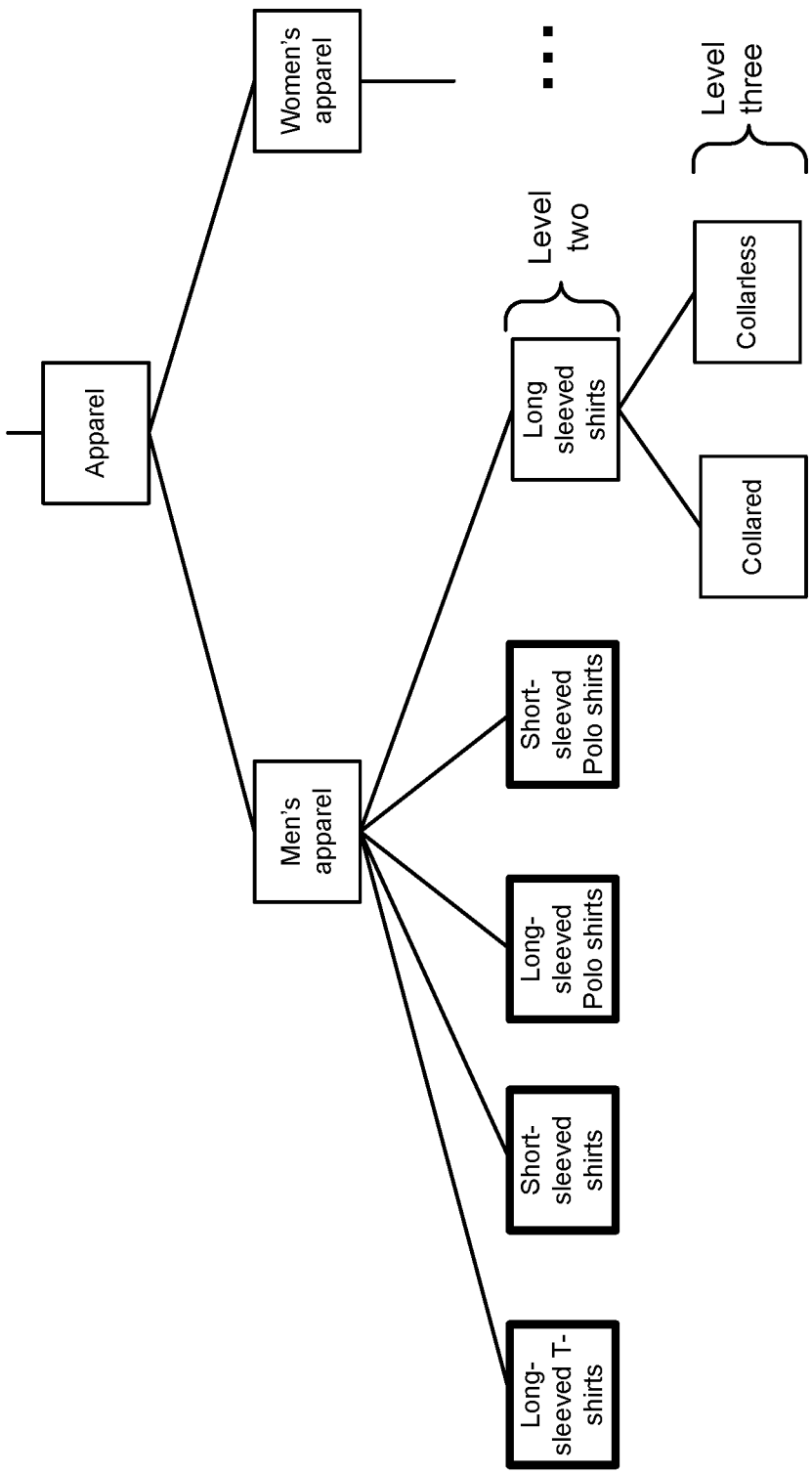
FIG. 6 shows an example of a category system in which a category has been replaced by a subcategory one level below it.
Figure 7:
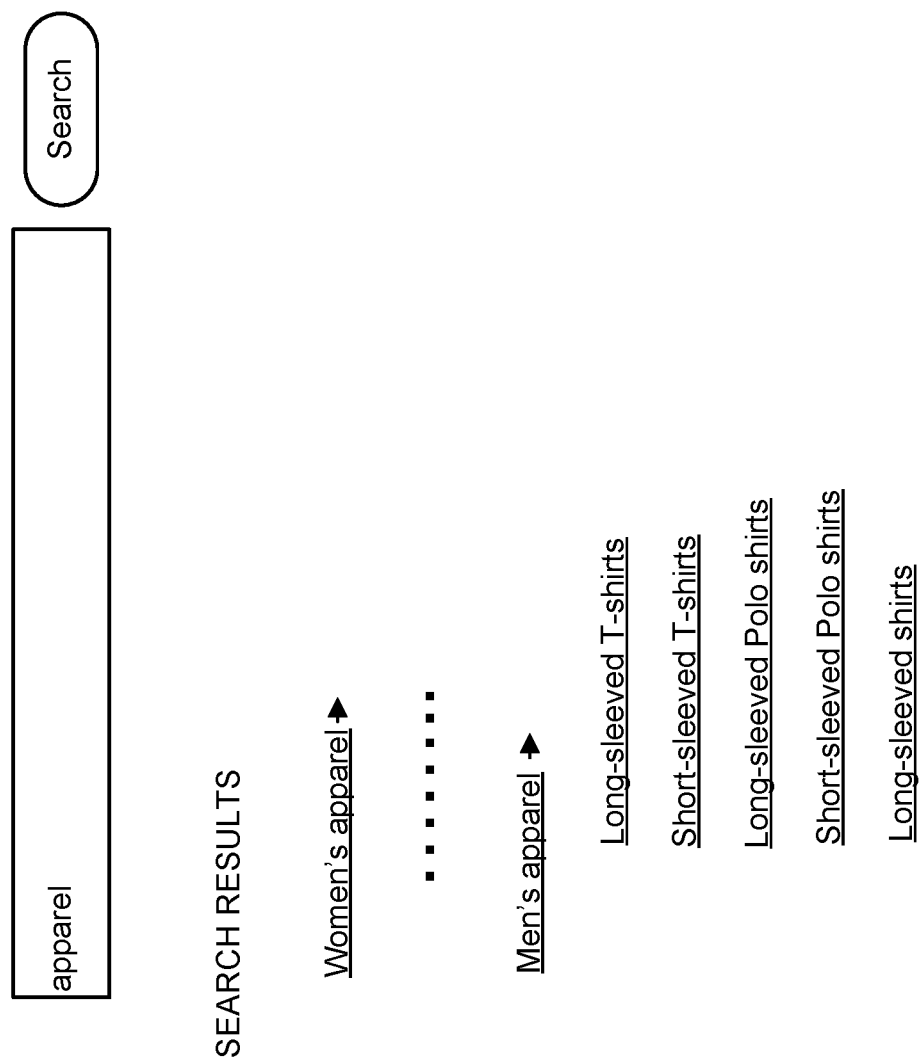
FIG. 7 shows an example of a user interface associated with the e-commerce website.

At 418, the current category is replaced with the selected subcategory(ies) one level below the current category and the selected subcategory(ies) are set as the current category(ies). Then the process returns to 404. Referring to the previous example associated with FIG. 5, the number of selected subcategories one level below the current category of "T-shirts," 2, is less than the number of expected recommendation categories associated with the subcategory one level below the current category of "T-shirts", 4. Thus the selected "Long-sleeved T-shirts" subcategory and the "Short-sleeved T-shirts" subcategory will replace the "T-shirts" category in the set of recommendation data to be returned. Furthermore, the "Long-sleeved T-shirts" and "Short-sleeved T-shirts" categories are determined to be current categories, and recursive computations begin again at 404. Likewise, the number of selected subcategories one level below the current category of "Polo shirts," 2, is less than the number of expected recommendation categories associated with the subcategory one level below the current category of "Polo shirts", 3. Thus, "Long-sleeved Polo shirts" and "Short-sleeved Polo shirts" will replace "Polo shirts" category in the set of recommendation data to be returned. Furthermore, the "Long-sleeved Polo shirts" and "Short-sleeved Polo shirts" categories are determined to be current categories, and recursive computations begin again at 404. After replacing the categories of "T-shirts" and "Polo shirts" with respective subcategories from one level below, the altered category system is depicted in FIG. 6. FIG. 6 shows that the categories of "T-shirts" and "Polo shirts" that were previously at level two have been respectively replaced by the categories of "Long-sleeved T-shirts" and "Short-sleeved T-shirts" and "Long-sleeved Polo shirts" and "Short-sleeved Polo shirts", which were previously located at level three. Assuming that the recursive computations stops after the category system is altered to appear like the example of FIG. 6, the example of FIG. 6 represents the portion of the category system determined to be sent to a user as recommendation data in response to the user's submission of the query term "apparel" (and not necessarily the altered category system stored at the back-end system). For example, FIG. 7 shows an example of a user interface associated with the e-commerce website. At the search box, the user searched for "apparel" and the search results include the category relationships as they were described in FIG. 6, where the categories directly (one level) below "Men's apparel" include "Long-sleeved T-shirts", "Short-sleeved T-shirts", "Long-sleeved Polo shirts", "Short-sleeved Polo shirts", and "Long-sleeved shirts".

Returning to FIG. 4, if subsequent recursive computations were to occur, then the categories of "Long-sleeved T-shirts, "Short-sleeved T-shirts," "Long-sleeved Polo shirts," and "Short-sleeved Polo shirts" could potentially all be replaced by subcategories one level below them. From process 400, it can be seen that through level-by-level screening and replacement, a category that is located at a low level of the category system but has a high click ratio can be directly upgraded to a higher level category within a recommended data set, which will enable a user to find this category quicker than before because the user would not need to click through as many higher category levels to reach this category in the hierarchy.

Below are some examples of navigation recommendation models that may be used with process 300 of FIG. 3 and process 400 of FIG. 4. As described above, a navigation recommendation model may be selected based on the reference data determined for a query term and the selected navigation recommendation model may be used to determine a current category (location) of the hierarchical category system at which a bottom-up recursive technique such as process 400 of FIG. 4 may begin computations. It should be noted that the navigation recommendation models below are merely examples and that other and/or different navigation recommendation models may be used as well.

1) Parent/Sub-Category Recommendation Model

An example of the parent/sub-category recommendation model comprises the following steps:

Step A1, the reference data associated with a query term is aggregated for each level one product category of the category system. In some embodiments, the reference data is proportionally weighted and normalized.

Step B1, the two level one product categories associated with the greatest number of clicks are set as two parent categories.

For example, the two level one product categories set as the parent categories may comprise two different level one product categories with the same number the clicks (click traffic) or two different level one product categories, one having the greatest number of clicks and the other having the second greatest number of clicks.

Step C1, the set of recommendation data associated with the query term is determined using the automatically launched recommendation technique (e.g., process 400 of FIG. 4) and the one or more subcategories of the parent categories are set as the current categories.

In application of the automatically launched recommendation technique, each sub-category one level below the parent categories (current category) is checked to see whether or not it can be replaced by a subcategory one level below it that meets a certain criteria to ultimately obtain recommendation data (e.g., product category and/or product attribute data) that are to be used as the recommendation data for the query term.

For example, referring back to FIG. 5, if the parent categories were set to be "men's apparel" and "women's apparel," then at least some of the set of recommendation data may be determined using the automatically launched recommendation technique with respect to each subcategory one level below "men's apparel" and "women's apparel", respectively. As such, each subcategory one level below the "men's apparel" and "women's apparel" product categories is set as a current category.

Step D1, the remaining level one categories (i.e., the level one categories that are not set as parent categories) are grouped as subcategories under a new parent category.

This third, new parent category may be defined as the "other" category. With respect to each subcategory one level below the "other" category, where each subcategory one level below the "other" category comprises a current category, the automatically launched recommendation technique is used to check whether the current category can be replaced by a subcategory one level below that meets certain criteria, to include in the set of recommendation data associated with the query term.

2) Divergent Recommendation Model

An example of the divergent recommendation model comprises the following steps:

Step A2, the reference data associated with a query term is aggregated for each level one product category of the category system. In some embodiments, the reference data is proportionally weighted and normalized.

Step B2, the level one categories are sorted from highest to lowest based on their respective click traffic and a predetermined number of the highest ranked level one categories is selected.

For example, the predetermined number of the highest ranked level one categories to be selected may be 16.

Step C2, each of the selected level one categories is set as a current category and the automatically launched recommendation technique is applied to determine whether each current category should be replaced by a subcategory one level below it that meets a certain criteria in a set of recommendation data associated with the query term.

Step D2, the remaining level one categories (i.e., the level one categories that are not set as parent categories) are grouped as subcategories under a new parent category called the "other" category. This third, new parent category may be defined as the "other" category. With respect to each subcategory one level below the "other" category, where each subcategory one level below the "other" category comprises a current category, the automatically launched recommendation technique is used to check whether the current category can be replaced by a subcategory one level below that meets certain criteria, to include in the set of recommendation data associated with the query term.

3) Express Category Recommendation Model

The express category recommendation model is used to perform a search at a particular product category that has a clear correspondence with the user's query term and where the search results return only products from this category. An example of the express category recommendation model comprises the following steps:

Step A3, the reference data associated with a query term is aggregated for each level one product category of the category system. In some embodiments, the reference data is proportionally weighted and normalized.

Step B3, one or more level one categories associated with the click ratios that exceed a predetermined threshold are selected. In some embodiments, the click ratio is the ratio of the click traffic of the level one category to the total click traffic for all categories.

For example, level one categories associated with click ratios that are greater than >0.98 are selected as the express recommendation categories.

Step C3, it is determined whether or not the relevant product quantity of each such selected level one category is greater than a predetermined quantity. If so, then a particular level one category is determined to be an express category and it is included in the set of recommendation data associated with the query term.

For example, said predetermined quantity may be set to 50.

Step D3, if it is determined that a particular express category is a leaf category, then product attributes under this category are also included in the set of recommendation data associated with the query term.

In some embodiments, attributes may also be included in the recommendation data such as determined using category/attribute mixed composition recommendation model as described in 5) below.

4) Recommendation Model with Incorporated Category Searching

If a particular category is implied in the query term, then this particular category can be located within the hierarchy of the category system directly and set as a current category for the application of the automatically launched recommendation technique.

An example of the recommendation model with incorporated category searching comprises the following steps:

Step A4, a relevant product category based on the category information implied in the query term is determined.

For example, if the query term were "men's apparel—T-shirts", then the query includes the product category of "Men's apparel." Then the reference data associated with the category of "Men's apparel" category is obtained.

Step B4, the reference data corresponding to the query term associated with subcategories one level below the determined category is obtained.

For example, the reference data associated with the subcategories "T-shirts," "Polo shirts," and "Long-sleeved shirts" that are one level below "Men's apparel" is obtained.

Step C4, the subcategories one level down from the determined category is ranked from highest to lowest based on their respective click traffic and a predetermined number of the highest ranked such subcategories is selected.

For example, after performing ranking based on click traffic, the three subcategories of "T-shirts," "Polo shirts," and "Long-sleeved shirts" are selected.

Step D4, each of the selected subcategories is set as a current category and the automatically launched recommendation technique is applied to determine whether each current category should be replaced by a subcategory one level below it that meets a certain criteria in a set of recommendation data associated with the query term.

For example, each of "T-shirts," "Polo shirts," and "Long-sleeved shirts" is set as a current category for an application of the automatically launched recommendation technique.

5) Category/Attribute Mixed Composition Recommendation Model

The attribute recommendation is a kind of express recommendation of attributes. This recommendation model may be used when a clear correspondence is determined between the user's query and a certain value of an attribute. Then a search is performed with the condition that the search results be associated with this particular attribute value.

An example of the category/attribute mixed composition recommendation model comprises the following steps:

Step A5, the reference data associated with the query term is obtained. In some embodiments, the reference data includes reference data associated with leaf categories and the product attributes included in the leaf categories.

Step B5, the product attributes are ranked from highest to lowest based on their respective click traffic and a predetermined number of the highest ranked product attributes are selected.

For example, 5 attributes ranked at the top may be selected.

Step C5, for each selected attribute described above, the attribute values associated with the attribute are ranked from highest to lowest based on their respective click traffic and a predetermined number of the highest ranked attribute values are selected.

Because each attribute has multiple possible attribute values, the attribute values need to be ranked for screening and selection purposes. For example, if the attribute is of a numerical value type, then the 6 values having the greatest number of clicks are selected and ranked.

Step D5, text matching between each selected attribute value and the query term is performed. If there is a complete match, or a synonym match, then the attribute is preselected.

Step E5, the multiple attributes associated with attribute values that have been pre-selected are included in the set of recommendation data associated with the query term.

For example, FIG. 8 shows an example of search results returned in response to a search with the query term of "dress". Column 802 shows the relevant attributes (e.g., "Brands", "Sleeve length") and column 804 shows some attribute values associated with each attribute (e.g., "H&M", "M2M").

Step F5, for the attributes that have been pre-selected, it is determined whether or not they have sub-attributes. If sub-attributes do exist, the sub-attributes are used to replace the attributes and are also determined to be included and displayed with the set of recommendation data.

A determination is made as to whether or not each pre-selected attribute described above has sub-attributes. If it does, then the sub-attributes will replace the attribute and the sub-attributes and their attribute values after replacement are included in the recommendation data corresponding to the query term.

6) "Books" Category Recommendation Model and "Shoes" Category Recommendation Model These explicit category recommendation models are similar to recommendations that incorporate a specific category. For both recommendation models, after a particular relevant category is located directly, the category is set as the current category and the automatically launched recommendation technique is applied to this current category. However, the difference between them lies in the fact that with recommendations that incorporate a category, the query term implies the category information, while with the "books" or "shoes" recommendation models, the query terms do not imply the category information but rather, based on the concentrations of clicks of level one categories, a determination can be made as to whether either the "books" category recommendation model or the "shoes" category recommendation model needs to be invoked.

Of course, in addition to these two types of specific category recommendation models, such recommendation models may exist for other specific categories as well.

7) Tiled Category Recommendation Model

Tiled recommendation is a recommendation method that is similar to divergent recommendation model, but the number of categories in tiled recommendation is relatively small. Generally, no more than 8 level one categories are included in the set of recommendation data for the tiled recommendation model, while more level one categories are generally included in the recommendation data for the divergent recommendation model.

It must be explained that, regarding the aforesaid method embodiments, for the sake of simplicity, all have been presented as combinations of a series of actions; however, persons skilled in the art should be aware that this application is not limited by the sequence of actions described, because pursuant to this application, certain steps may be executed in other sequences or simultaneously.

Figure 9:
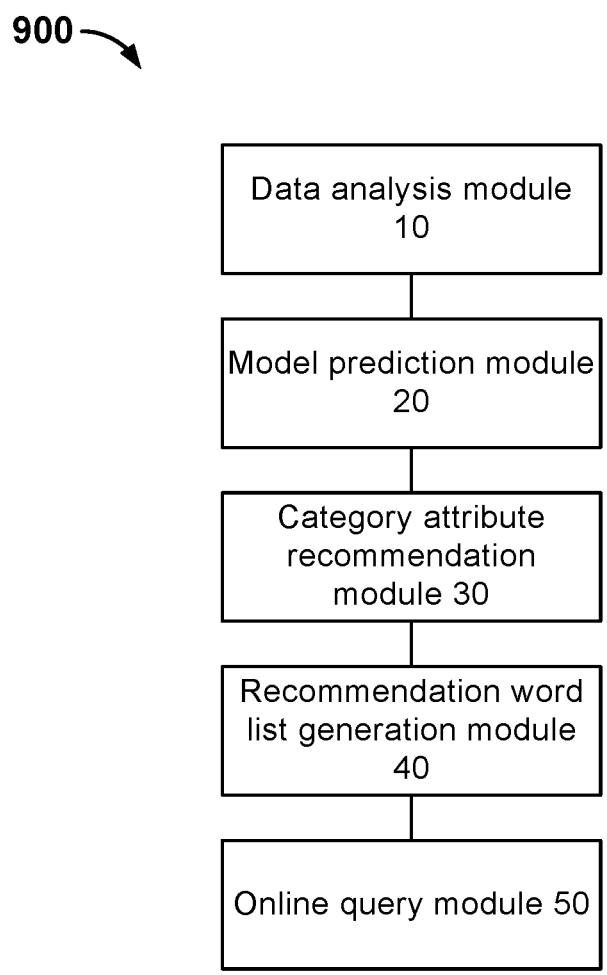
FIG. 9 is a diagram showing an embodiment of a system for enabling intelligent navigation through a category system.

FIG. 9 is a diagram showing an embodiment of a system for enabling intelligent navigation through a category system. In the example, system 900 includes data analysis module 10, model prediction module 20, category attribute recommendation module 30, recommendation list generation module 40, and online query module 50.

The modules can be implemented as software components executing on one or more processors, as hardware such as programmable logic devices and/or Application Specific Integrated Circuits designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Data analysis module 10 is configured to perform analysis of historical user activity data with respect to a query term to generate reference data associated with a query term.

Model prediction module 20 is configured to select a navigation recommendation model for the query term based at least in part on the reference data. In some embodiments, each of at least some navigation recommendation models from which an appropriate navigation recommendation model is selected uses a "bottom-up" recursive technique to determine at least one product category within the hierarchy of the category system to move up to a higher level.

Category attribute recommendation module 30 is configured to use the reference data and the selected navigation recommendation model to determine a set of recommendation data associated with the query term, wherein the recommendation data includes at least a portion of a category system to be displayed in response to a subsequently received query including the query term.

Recommendation word list generation module 40 is configured to record an association between the recommendation data and the query term in a recommendation list.

Online query module 50 is configured to receive a subsequent user query and look up corresponding recommendation data associated with a query term in the user query in the recommendation list.

Figure 10:
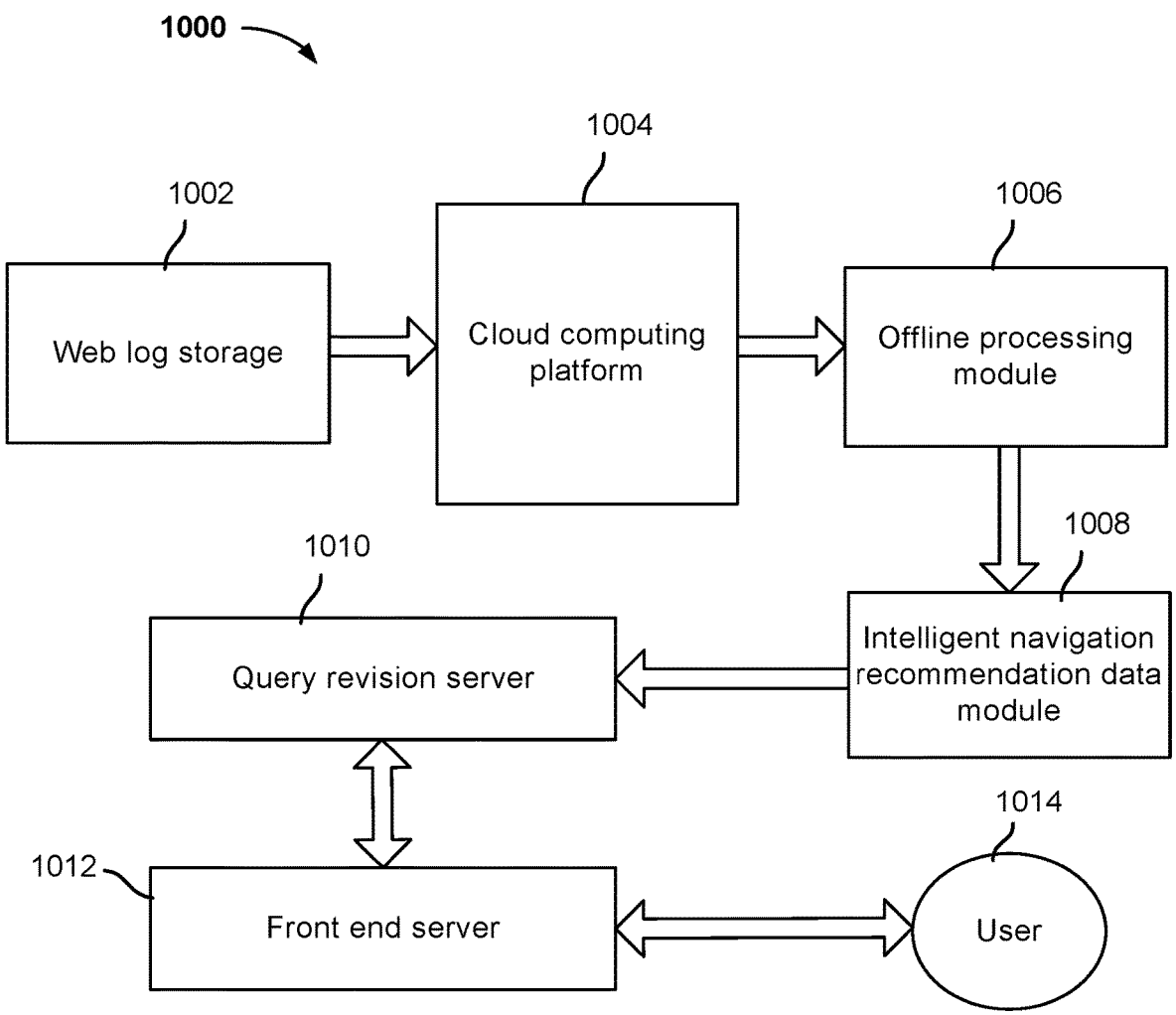
FIG. 10 is a diagram showing an embodiment of a system for enabling intelligent navigation through a category system.

FIG. 10 is a diagram showing an embodiment of a system for enabling intelligent navigation through a category system. System 100 includes web log storage 1002, cloud computing platform 1004, offline processing module 1006, intelligent navigation recommendation data 1008, query revision server 1010, front end server 1012, and user 1014.

Web log storage 1002 is configured to store web logs that document historical user activity such as historical user clicks, historical user purchases, and historical user searches. Because the web log data can be abundant, statistical analysis of the stored web log data can be performed at least partially concurrently across multiple devices, such as at cloud computing platform 1004. In some embodiments, cloud computing platform 1004 is also configured to generate reference data corresponding to the categories of a category system for each of a plurality of query terms. In some embodiments, cloud computing platform 1004 is configured to select a navigation recommendation model for a query term based on its associated reference data. The reference data and the selected navigation recommendation model are used together to determine a set of recommendation data to be associated with the query term. The determined recommendation data for the query term are sent to offline processing module 1006, to perform any additional processing. Then the recommendation data is sent to intelligent navigation recommendation data module 1008 where an association between the recommendation data and the query term is recorded in a recommendation list.

Query revision server 1010, in some embodiments, is supported by a powerful Apache framework. Query revision server 1010 is configured to revise and/or add auxiliary information to query terms received from user 1014 through front end server 1012. In some embodiments, sets of recommendation data are compiled into binary files and loaded into query revision server 1010. Then in response to user 1014 submitting a search query through front end server 1012, query revision server 1010 is configured to return data that includes any recommendation data that is associated with a query term included in the search query.

Each of the embodiments contained in this specification is described in a progressive manner, the explanation of each embodiment focuses on areas of difference from the other embodiments, and the descriptions thereof may be mutually referenced for portions of each embodiment that are identical or similar.

The e-commerce website navigation method and system offered by the present application have been described in detail above. This document has employed specific examples to expound the principles and embodiments of the present application. The above embodiment explanations are only intended to aid in comprehension of the methods of the present application and of its core concepts. Moreover, a person with general skill in the art would, on the basis of the concepts of the present application, be able to make modifications to specific applications and to the scope of applications. To summarize the above, the contents of this specification should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   performing analysis of historical user activity data with respect to a query term to generate reference data associated with the query term;
   selecting a navigation recommendation model for the query term based at least in part on the reference data;
   using the selected navigation recommendation model to determine an initial current category of a category system;
   selecting at least one subcategory associated with the determined initial current category, the at least one subcategory being at least one level below a level associated with the determined initial current category, wherein the selecting of the at least one selected subcategory is based at least in part on the determined initial current category and a portion of the reference data associated with the at least one subcategory;
   generating a set of recommendation data that includes the at least one selected subcategory having been moved to the level associated with the determined initial current category in the category system; and
   recording an association between the set of recommendation data and the query term in a recommendation list, wherein the set of recommendation data includes at least a portion of the category system to be displayed in response to a subsequently received query including the query term.

2. The method of claim 1, wherein the historical user activity data includes one or more of the following: user click activity, user purchase activity, and user search activity with respect to one or more product categories included in the category system.

3. The method of claim 1, wherein the category system includes a hierarchy of product categories associated with an e-commerce website.

4. The method of claim 1, wherein the selected navigation recommendation model is configured to use the reference data to determine the initial current category of the category system at which a recursive technique configured to determine whether the at least one selected subcategory associated with the initial current category should be moved up a level in the category system is to begin.

5. The method of claim 1, wherein the query term comprises a first query term and the method further comprising:
   receiving a search query;
   determining a second query term from the search query; and
   searching the recommendation list for the second query term.

6. The method of claim 1, wherein the query term comprises a first query term and the method further comprising:
   receiving a search query;
   determining a second query term from the search query;
   searching the recommendation list for the second query term; and
   in the event that the second query term is found in the recommendation list, displaying a set of recommendation data associated with the second query term in the recommendation list.

7. The method of claim 1, further comprising replacing the determined initial current category with the moved at least one selected subcategory.

8. The method of claim 1, further comprising:
   determining a number of expected recommendation subcategories associated with the determined initial current category, comprising:
   in the event that a number of the at least one selected subcategory is greater than the number of expected recommendation subcategories, omitting to move the at least one selected subcategory.

9. The method of claim 1, further comprising:
   determining a number of expected recommendation subcategories associated with the determined initial current category, comprising:
   in the event that a number of the at least one selected subcategory is not greater than the number of expected recommendation subcategories, setting the at least one selected subcategory as a next current category.

10. A computer program product, the computer program product comprising a non-transitory computer readable storage medium and comprising computer instructions for:
    performing analysis of historical user activity data with respect to a query term to generate reference data associated with the query term;
    selecting a navigation recommendation model for the query term based at least in part on the reference data;
    using the selected navigation recommendation model to determine an initial current category of a category system;
    selecting at least one subcategory associated with the determined initial current category, the at least one subcategory being at least one level below a level associated with the determined initial current category, wherein the selecting of the at least one selected subcategory is based at least in part on a portion of the reference data associated with the at least one subcategory;

generating a set of recommendation data that includes the at least one selected subcategory having been moved to the level associated with the determined initial current category in the category system; and recording an association between the set of recommendation data and the query term in a recommendation list, wherein the set of recommendation data includes at least a portion of the category system to be displayed in response to a subsequently received query including the query term.

11. The computer program product of claim 10, wherein the historical user activity data includes one or more of the following: user click activity, user purchase activity, and user search activity with respect to one or more product categories included in the category system.

12. The computer program product of claim 10, wherein the category system includes a hierarchy of product categories associated with an e-commerce website.

13. The computer program product of claim 10, wherein the selected navigation recommendation model is configured to use the reference data to determine the initial current category of the category system at which a recursive technique configured to determine whether the at least one selected subcategory associated with the initial current category should be moved up a level in the category system is to begin.

14. The computer program product of claim 10, wherein the query term comprises a first query term and the computer instructions further comprising:

receiving a search query;

determining a second query term from the search query; and searching the recommendation list for the second query term.

15. The computer program product of claim 10, wherein the query term comprises a first query term and the computer instructions further comprising:

receiving a search query;

determining a second query term from the search query;

searching the recommendation list for the second query term; and in the event that the second query term is found in the recommendation list, displaying a set of recommendation data associated with the second query term in the recommendation list.

16. The computer program product of claim 10, further comprising replacing the determined initial current category with the moved at least one selected subcategory.

17. The computer program product of claim 10, further comprising:

determining a number of expected recommendation subcategories associated with the determined initial current category, comprising:

in the event that a number of the at least one selected subcategory is greater than the number of expected recommendation subcategories, omitting to move the at least one selected subcategory.

18. The computer program product of claim 10, further comprising:

determining a number of expected recommendation subcategories associated with the determined initial current category, comprising:

in the event that a number of the at least one selected subcategory is not greater than the number of expected recommendation subcategories, setting the at least one selected subcategory as a next current category.

19. A system, comprising:

one or more processors configured to:

perform analysis of historical user activity data with respect to a query term to generate reference data associated with the query term;

select a navigation recommendation model for the query term based at least in part on the reference data;

use the selected navigation recommendation model to determine an initial current category of a category system;

select at least one subcategory associated with the determined initial current category, the at least one subcategory being at least one level below a level associated with the determined initial current category, wherein the selecting of the at least one selected subcategory is based at least in part on a portion of the reference data associated with the at least one subcategory;

generate a set of recommendation data that includes the at least one selected subcategory having been moved to the level associated with the determined initial current category in the category system; and record an association between the set of recommendation data and the query term in a recommendation list, wherein the set of recommendation data includes at least a portion of the category system to be displayed in response to a subsequently received query including the query term; and one or more memories coupled to the one or more processors and providing instructions to the one or more processors.

* * * * *